FAST-SWITCHING ARRANGEMENT FOR THE TRANSFER OF COMMUNICATION CHANNELS

Filed Sept. 26, 1962 2 Sheets-Sheet 1

INVENTORS
Alan J. Buxton
Richard A. Heine
Robert G. Mannas

BY C. A. Gulbrandsen
Atty.

INVENTORS
Alan J. Buxton
Richard A. Heine
Robert G. Mannas
BY
C. A. Bullwinkel
Atty.

United States Patent Office 3,204,204

Patented Aug. 31, 1965

3,204,204

FAST-SWITCHING ARRANGEMENT FOR THE TRANSFER OF COMMUNICATION CHANNELS

Alan J. Buxton, Saratoga, Richard A. Heine, Redwood City, and Robert G. Mannas, Palo Alto, Calif., assignors, by mesne assignments, to Automatic Electric Laboratories, Inc., Northlake, Ill., a corporation of Delaware Filed Sept. 26, 1962, Ser. No. 226,279
6 Claims. (Cl. 333—1.1)

This invention relates to a fast-switching arrangement for the transfer of communication channels, and more particularly to a protection system utilizing microwave gyromagnetic isolators to transfer a standby transmitter in place of the main transmitter upon failure of the output power or upon failure of the transmitter pilot.

In the past, isolators have been used as microwave switches, however, the switching time of the present isolators has been less than desirable. Furthermore, the standby transmitter caused interference with the main transmitter during normal operation.

A principal object of this invention is, therefore, the provision of a greatly reduced switching time of the isolators.

Another object is to attenuate interference from the standby transmitter during normal operation.

The main transmitter is connected to a common output by a microwave switch utilizing a gyromagnetic element. The standby transmitter is also connected to the common output by a similar microwave switch. Each waveguide switch has an inductor connected to control circuitry for the production of a magnetic field that is coupled to the gyromagnetic element. The control circuitry receives failure indications from the transmitter and initiates the transfer.

According to the invention, a fast-switching arrangement for the transfer of communication channels is provided using a large inductance in the control circuitry connected in series with each of two parallel paths. The two paths are provided with switching devices to allow current-flow in one and to prevent current-flow in the other. Since each isolator has two inductors, the first path connects the first inductor of the main transmitter's isolator in series with the second inductor of the standby transmitter's isolator. The second path connects the first inductor of the standby transmitter's isolator in series with the second inductor of the main transmitter's isolator. The large inductance being in series with the isolator coils tends to keep the isolator current constant when the isolators are switched from one condition to the other, thereby providing a greatly reduced switching time. When the isolators are switched, the change in the magnetic field in the large series inductance induces a relatively large voltage in the isolator inductor. The magnitude of this voltage is proportional to the rate of change of the magnetic field in the inductor and is therefore inversely proportional to the switching time of the isolators.

A flip-flop circuit receives a transmitter failure indication and controls two switching transistors, each of which are located in one of the two parallel paths. The flip-flop causes the one transistor switch to operate, thereby closing one of the paths; and at the same time it causes the other switch to be nonoperated which opens the other path.

A switching isolator is used in each transmitter following the transmitter klystron and discriminator. Each isolator utilizes two inductors to produce Faraday-Rotation, thereby rotating the plane of polarization of the electromagnetic field in the waveguide. For minimum loss, current-flow in the first inductor will cause the plane of polarization of the electromagnetic field in the waveguide to be rotated 45° from normal. Since the output of the waveguide is rotated 45° from the input, the electromagnetic field emerges with minimum attenuation. For maximum attenuation, current-flow in the second inductor produces a magnetic field in the opposite direction as produced by the first inductor, thereby rotating the plane of polarization 45° in the opposite direction.

According to a further feature of the invention, the output on the flip-flop has the additional function of controlling the pilot oscillators for both the standby and the main transmitters. Under normal conditions, the output of the flip-flop attenuates the output of the pilot oscillator of the main transmitter and at the same time, the output of the pilot oscillator of the standby transmitter is increased to full intensity. The resultant high level of modulation of the standby transmitter effectively places the level of interference from the standby transmitter sufficiently below the idle noise level of the main transmitter at the baseband frequencies. Thus the interference from the standby transmitter is inaudible. When a failure occurs, the conditions of the two pilots are reversed and the interference from the main transmitter is suppressed.

The above-mentioned and other objects and features of this invention and the manner of attaining them will become more apparent and the invention itself will be best understood, by reference to the following description of an embodiment of the invention taken in conjunction with the accompanying drawings comprising FIGS. 1 and 2 wherein.

Figure 1:
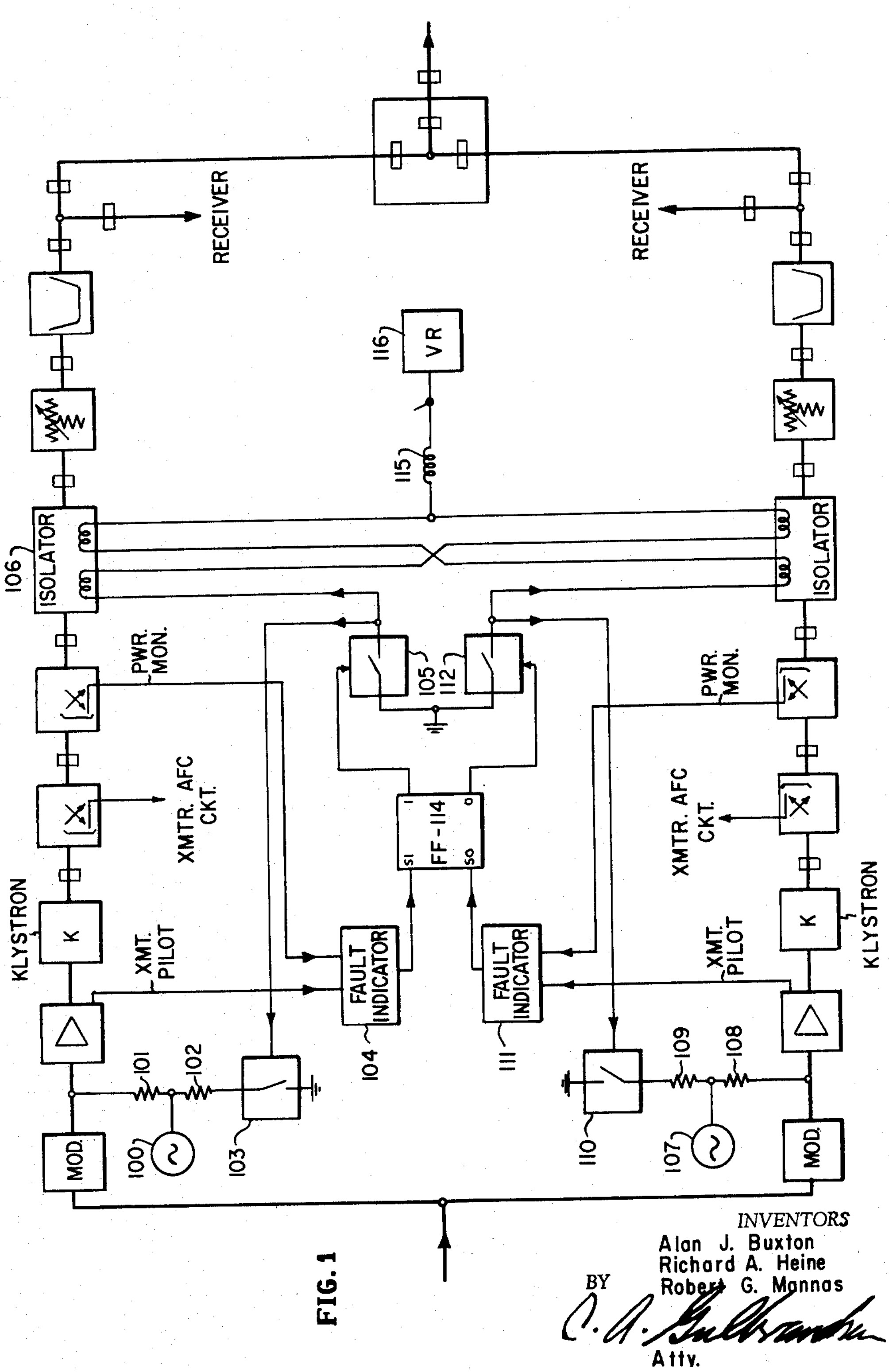
FIG. 1 is a block diagram of a fast-switching arrangement for the transfer of communication channels.

Referring to FIG. 1, this fast-switching arrangement for the transfer of communication channels comprises two microwave transmitters each of which are coupled to the same antenna. The baseband portion of the transmitting unit combines the carrier and supervisory signals, inserts a 10-kc. pilot signal from oscillator 100 and oscillator 107 and amplifies the combination of carrier signal, supervisory signal and pilot. These amplified signals directly modulate the transmitting klystron. The resultant frequency-modulated R-F signal from the klyston passes through a directional coupler where a portion of the transmitted signal is connected to the transmitter automatic frequency control. The main transmitter signal is then passed through a second directional coupler where a portion of the transmitter energy is made available to fault indicator 104 and 111. The main signal is then coupled to the reversible switching isolators 106 and 113 which simulate a single-pole, single-throw switch with respect to the R-F power. The ferrite isolator is directly coupled to a test fade pad, which is then coupled to a wave guide transmit band-pass filter. The output of the filter is connected to a T-junction together with the input to the receiver. The T-junction is directly connected to the antenna, thereby placing both transmission paths in parallel.

The pilot signals are coupled from the baseband amplifier to the fault indicators to provide an alarm indication in the event of pilot failure. The power monitor is also coupled to the fault indicators, which register a fault indication either upon failure of the pilot signal or upon failure of the transmitter R-F power output.

The output of the fault indicators are connected to the inputs of flip-flop 114, causing the flip-flop to change states when a fault indication is received. During normal operation, the flip-flop is in state 1, thereby closing electronic switch 105 and opening electronic switch 112. Therefore, ground is coupled to a series connection of the first inductor of isolator 106 and the second inductor of isolator 113. This series connection is permanently connected through inductor 115 to voltage regulator 116.

Ground is also coupled to electronic switch 103, thereby causing it to remain operated. Its operation effectively short circuits pilot oscillator 100.

Failure of the transmitter 10-kc. pilot or a drop of 3 db or more of the transmitter R-F power output initiates a transfer by applying a failure indicator to flip-flop 114. The flip-flop changes from state 1 to state 0, thereby closing electronic switch 112 and opening electronic switch 105. As a result ground is connected to an alternate series path, connecting the first inductor of isolator 113 and the second inductor of isolator 106. This series path is also permanently connected to inductor 115 and voltage regulator 116. The change causes isolator 106 to produce maximum loss, and to prevent the faulty R-F power from reaching the antenna. Isolator 113 produces minimum loss, thereby coupling full R-F power to the antenna.

This effect is produced because of a rotation of the plane of polarization of the electromagnetic field in the isolators. For minimum loss, current-flow in the first inductor will cause the plane of polarization of the electromagnetic field in the wave guide to be rotated 45° from normal. Since the output of the isolator is rotated 45° from the input, the electromagnetic field emerges with minimum attenuation. For maximum attenuation, current-flow in the second inductor produces a magnetic field in the opposite direction as produced by the first inductor, rotating the plane of polarization 45° in the opposite direction.

The change of state of flip-flop 114 also connects ground to electronic switch 110, causing it to close and providing oscillator 107 with a short circuit to ground. Since resistor 109 is relatively smaller than resistor 108, the output signal from pilot oscillator 107 flows through resistor 109, thereby attenuating the pilot oscillator level of the standby transmitter. Furthermore, electronic switch 103 opens in response to the opening of switch 105, thereby allowing the output of pilot oscillator 100 to flow with full intensity through resistor 101, thereby attenuating the pilot oscillator level of the standby transmitter. Thus the interference from the muted transmitter becomes inaudible at the antenna.

Figure 2:
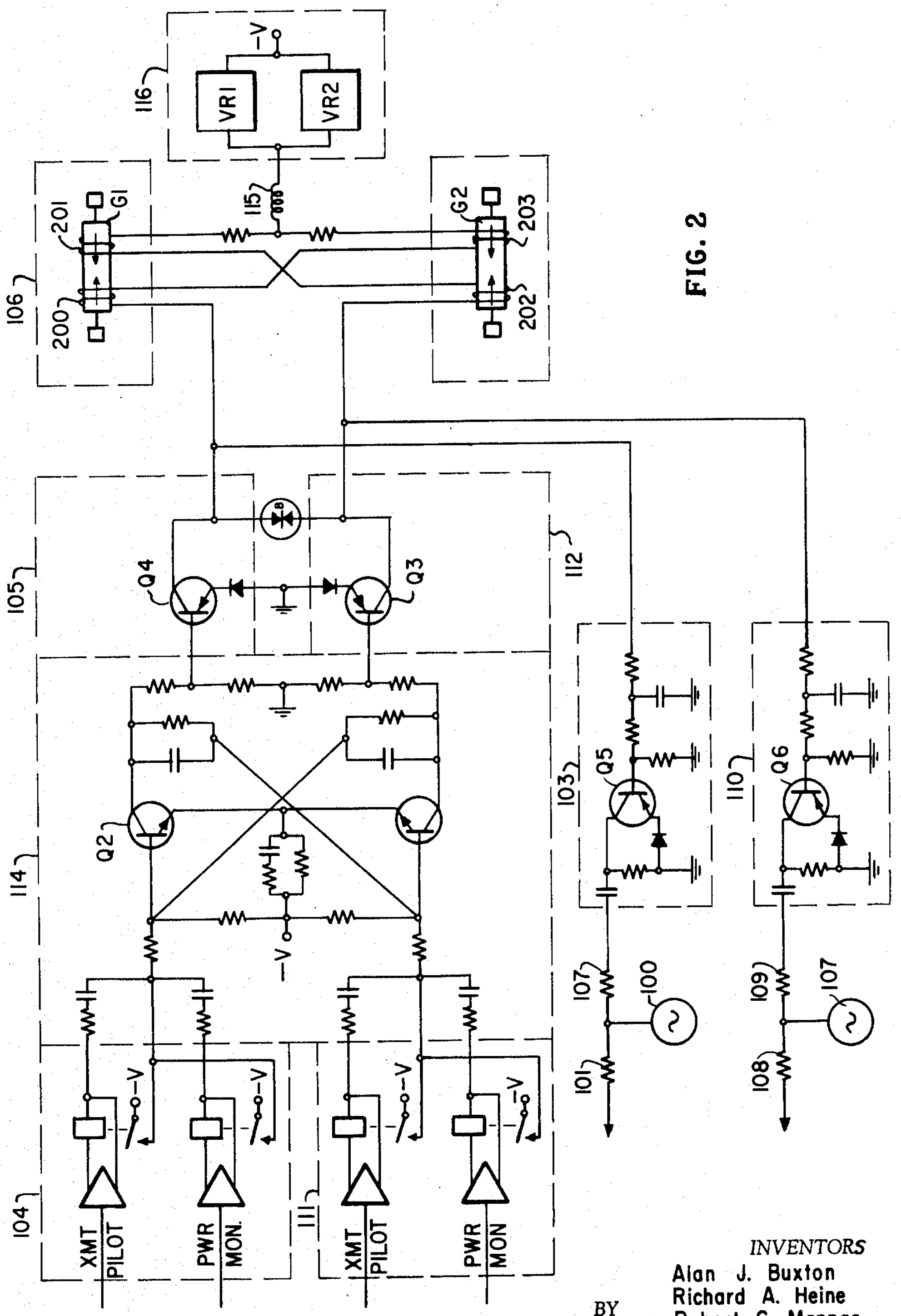
FIG. 2 is a schematic diagram of a selected portion of the arrangement.

Referring now to FIG. 2, failure of operation of either the transmitter pilot or the power monitor will cause a relay to release, thereby applying a voltage to the base of transistor Q2 and flip-flop 114. During normal operation the reception of this voltage changes transistor Q2 from saturation to non-conduction, causing the flip-flop to change states. Ground is therefore coupled to the base of transistor Q4, which becomes non-conducting and causes transistor Q6 to become non-conducting. At the same time transistor Q3 becomes saturated, causing transistor Q5 to be saturated.

Under normal conditions current-flow in inductor 200 of isolator 106 produces a magnetic field in such a direction to cause the plane of polarization of the electromagnetic wave to be rotated due to the Faraday-effect with gyro-magnetic element G1. This rotation creates minimum loss to the R-F power being transmitted to the antenna. Current-flow through the second inductor of isolator 106 produces a magnetic field in the opposite direction due to the reverse winding of inductor 201, thereby causing the plane of polarization to be rotated 45° in the opposite direction and producing maximum loss. After a failure has been detected, transistor Q3 becomes saturated which produces current flow through inductor 202 and inductor 201 to cause minimum loss in isolator 113 and maximum loss in isolator 106.

The isolator attenuation is directly related to the rotation of the plane of polarization which is a function of the current in the isolator inductors. As a consequence the isolator switching time is dependent on the speed with which the current in the isolator inductors is switched.

The large inductor 115 which is directly connected to both series paths tends to keep the isolator current constant when the isolators are switched from one condition to the other. When the isolators are switched, the change in the magnetic field in inductor 115 induces a large voltage in the isolator inductors. The magnitude of this voltage is proportional to the speed with which the magnetic field in inductor 115 is changed and is therefore inversely proportional to the switching time of the isolators.

Inductor 115 is connected to voltage regulated power supply 116. This power supply utilizes two voltage regulators VR1 and VR2, which are connected in parallel for maximum protection and reliability. Furthermore, voltage regulation is necessary to provide constant current through the isolator inductors.

While we have described above the principles of our invention in connection with specific apparatus, it is to be clearly understood that this description is made only by way of example and not as a limitation to the scope of our invention.

What is claimed is:

1. In combination, first and second devices respectively coupling first and second input signal paths to a common output signal path, each device having a first and second inductive winding;
 - a direct-current supply source;
 - an inductor;
 - a first circuit path comprising the first winding of the first device, the second winding of the second device, and first switching means in series;
 - a second circuit path comprising the first winding of the second device, and the second winding of the first device, and second switching means in series;
 - each said circuit path including the supply source and the inductor;
 - current-flow in the first circuit path providing minimum attenuation to said first input path by means of the first winding of said first device and maximum attenuation to said second input path by means of the second winding of said second device;
 - current-flow in the second circuit path providing minimum attenuation to said second input path by means of the second winding of said second device and maximum attenuation to said first input path by means of the first winding of said first device;
 - means controlling said first and second switching means to close the circuit paths selectively with each circuit path being opened upon the closing of the other;
 - the self-induced voltage of the inductor responsive to the opening of one circuit path upon closure of the other circuit path being effective to aid the voltage of the supply source and oppose the voltage induced in the closed circuit path, to thereby increase the rate of rise of output current flow.

2. A combination according to claim 1, further comprising:
 - a first signal source coupled to said first input signal path;
 - a second signal source coupled to said second input signal path;
 - said means controlling said first and second switching means being a bi-stable trigger device having its output terminal means coupled to respective input control terminals of said switching means,
 - means connecting the output terminal means of the trigger device to said signal sources to cause the signal source coupled to the input signal path with minimum attenuation to have a relatively high output signal strength and the other signal source to have a relatively lower output signal strength.

3. A combination according to claim 2, further comprising:
 - a detection means which is responsive to a decrease in the output of the first signal source or a decrease in the output of said output signal path to initiate the change of state of the bi-stable trigger device.

4. The combination as claimed in claim 3, wherein the first and second switching means each comprise a transistor switch.

5. A combination according to claim 1, wherein the first and second input signal paths and the common output path are waveguide apparatus and said first and second devices are waveguide isolator apparatus each containing a gyromagnetic element for providing Faraday-rotation.

6. A combination according to claim 5, wherein current-flow in the first winding of the first and second waveguide isolator apparatus produces a magnetic field in one direction and current-flow in the second winding of the first and second waveguide isolator apparatus produces a magnetic field in the opposite direction, thereby rotating the plane of polarization of the electromagnetic field in the waveguide to allow transmission in the one direction and to prevent transmission in the opposite direction.

References Cited by the Examiner

UNITED STATES PATENTS

| | | | |
|---|---|---|---|
| 2,229,089 | 1/41 | Kinsburg | 333—16 |
| 2,396,990 | 3/46 | Dysart | 333—3 |
| 3,031,631 | 4/62 | Moran | 333—24.3 |
| 3,045,185 | 7/62 | Matchwich | 333—24.3 |

HERMAN KARL SAALBACH, *Primary Examiner.*